US009933758B2

(12) United States Patent
Amselem

(10) Patent No.: US 9,933,758 B2
(45) Date of Patent: Apr. 3, 2018

(54) TELEMATICS ON-BOARD UNIT FOR VEHICLES

(71) Applicant: Allianz Telematics S.p.A., Trieste (IT)

(72) Inventor: Jacques Amselem, Trieste (IT)

(73) Assignee: Allianz Telematics S.p.A., Trieste (IT)

( * ) Notice: Subject to any disclaimer, the term of this patent is extended or adjusted under 35 U.S.C. 154(b) by 687 days.

(21) Appl. No.: 13/623,535

(22) Filed: Sep. 20, 2012

(65) Prior Publication Data

US 2013/0169410 A1 Jul. 4, 2013

(30) Foreign Application Priority Data

Sep. 21, 2011 (EP) ..................................... 11007677

(51) Int. Cl.
*G08B 19/00* (2006.01)
*G05B 1/01* (2006.01)
(Continued)

(52) U.S. Cl.
CPC ............... *G05B 1/01* (2013.01); *G07C 5/008* (2013.01); *G06Q 40/08* (2013.01); *G07C 5/08* (2013.01)

(58) Field of Classification Search
CPC . G05B 1/01; G07C 5/008; G07C 5/08; G06Q 40/08
See application file for complete search history.

(56) References Cited

U.S. PATENT DOCUMENTS 6,198,996 B1 * 3/2001 Berstis ............................ 701/36
6,502,020 B2 * 12/2002 Lang ............................ 701/31.4
(Continued)

FOREIGN PATENT DOCUMENTS

DE 102008012287 A1 9/2009
EP 0700009 A2 3/1996
(Continued)

OTHER PUBLICATIONS

Report from CO Patent Office of CO Office Action received in related Colombian Patent Application No. 14.061.407, dated Jul. 2, 2015.
(Continued)

*Primary Examiner* — Quang D Pham
(74) *Attorney, Agent, or Firm* — Troutman Sanders LLP; Ryan A. Schneider

(57) ABSTRACT

The present invention relates to telematics on-board units for vehicles including data collection means for collecting vehicle usage data, data transmission means for transmitting collected vehicle usage data and/or analyzed vehicle usage data derived therefrom, to a telematics service platform and driver identification means for identifying a driver using the vehicle and providing a driver identification. In accordance with the present invention, the driver identification means includes a plurality of peripheral elements of different types for entering, detecting and/or receiving different identification data for determining the driver identification on the basis of different identification features, the different peripherals being integrated in a common component to be installed in the vehicle's passenger compartment, thereby simplifying the installation of the device in the vehicle and reducing time and costs of first installation and reducing the number of possible mistakes done during the installation which usually would result in a recall to the installation plant with all costs associated.

28 Claims, 4 Drawing Sheets

(51) Int. Cl.
  *G07C 5/00* (2006.01)
  *G06Q 40/08* (2012.01)
  *G07C 5/08* (2006.01)

(56) References Cited

U.S. PATENT DOCUMENTS

| | | | | |
|---|---|---|---|---|
| 6,549,118 | B1* | 4/2003 | Seal | G06K 9/00597 340/5.52 |
| 6,622,083 | B1* | 9/2003 | Knockeart et al. | 701/533 |
| 6,748,301 | B1* | 6/2004 | Ryu | B60K 28/063 340/426.11 |
| 6,897,767 | B2* | 5/2005 | Kim | G07C 9/00039 340/426.3 |
| 8,682,525 | B1* | 3/2014 | Kalinadhabhotla | G07C 5/008 340/442 |
| 8,775,020 | B2* | 7/2014 | Miller et al. | 701/36 |
| 2002/0022979 | A1* | 2/2002 | Whipp et al. | 705/5 |
| 2002/0152018 | A1* | 10/2002 | Duckeck | 701/201 |
| 2003/0016130 | A1* | 1/2003 | Joao | 340/539 |
| 2004/0158367 | A1* | 8/2004 | Basu | G07C 5/006 701/31.9 |
| 2005/0251579 | A1* | 11/2005 | Ngo | G07C 5/085 709/234 |
| 2005/0288827 | A1* | 12/2005 | Watkins | 701/1 |
| 2006/0112103 | A1* | 5/2006 | Besserman et al. | 707/10 |
| 2007/0106454 | A1* | 5/2007 | Nonaka | G08G 1/092 701/423 |
| 2007/0124599 | A1* | 5/2007 | Morita | B60R 25/25 713/186 |
| 2007/0153802 | A1* | 7/2007 | Anke | H04L 47/10 370/395.42 |
| 2009/0157253 | A1* | 6/2009 | Gumpinger | 701/33 |
| 2009/0261947 | A1* | 10/2009 | Watanabe | G06F 21/32 340/5.82 |
| 2012/0029945 | A1* | 2/2012 | Altieri | G06Q 40/08 705/4 |
| 2013/0036200 | A1* | 2/2013 | Roberts et al. | 709/219 |

FOREIGN PATENT DOCUMENTS

| | | | |
|---|---|---|---|
| EP | 1239404 A2 * | 6/2002 | |
| EP | 1241599 A1 | 9/2002 | |
| EP | 1746537 A2 | 1/2007 | |
| EP | 2058197 A1 | 5/2009 | |
| JP | 2002-319087 | 10/2002 | |
| JP | 2002-319096 | 10/2002 | |
| JP | 2003-051892 | 2/2003 | |
| JP | 2004-118370 | 4/2004 | |
| JP | 2004-190233 | 7/2004 | |
| JP | 2004-359048 | 12/2004 | |
| JP | 2006-053645 | 2/2006 | |
| JP | 2006-088829 | 4/2006 | |
| JP | 2006-224883 | 8/2006 | |
| JP | 2007-245775 | 9/2007 | |
| JP | 2007-264730 | 10/2007 | |
| JP | 2007-332546 | 12/2007 | |
| JP | 2008-003659 | 1/2008 | |
| JP | 2009-003659 | 1/2009 | |
| JP | 2009-500246 | 1/2009 | |
| JP | 2009-526707 | 7/2009 | |
| JP | 2010-128639 | 6/2010 | |
| JP | 2010-195061 | 9/2010 | |

OTHER PUBLICATIONS

Report from CO Patent Firm Cavelier Abogados reporting the CO Office Action in related Colombian Patent Application No. 14.061.407, dated Aug. 19, 2015, serving as the translation of NPL 1 above (and redacted in portions that reflect firm commentary).
Sistemas telemáticos, by José Manuel Huidobro, José Manuel Huidobro Moya, 3rd Edition, dated 2005, being D3 cited in CO Office Action received in related Colombian Patent Application No. 14.061.407, dated Jul. 2, 2015, the only pages of same providing by the CO Patent Office being the front page, p. 38 and p. 200 of D3.
Office Action issued by the Japanese Patent Office for related Japanese Patent Application No. 2014-531127 dated May 31, 2016.
Office Action issued by the Israel Patent Office for related Israeli Patent Application No. 231578 dated Jul. 26, 2016.
Office Action issued by the State Intellectual Property Office of the People's Republic of China for related Chinese Patent Application No. 201280045936.5 dated Jun. 21, 2016.
Office Action issued by Russian Federal Service for Intellectual Property for related Russian Patent Application No. 2014115475 dated Sep. 28, 2016.
Extended European Search Report issued by the European Patent Office for related European Patent Application No. 11007677.5 dated Mar. 28, 2012.
Examination Report issued by the European Patent Office for related European Patent Application No. 11007677.5 dated Aug. 1, 2016.
Jain et al.,"An Introduction to Biometric Recognition", IEEE Transactions on Circuits and Systems for Video Technology, vol. 14, No. 1 (Jan. 2004), pp. 4-20, XP011105912, ISSN: 1051-8215, DOI: 10.1109/TCSVT.2003.818349.

* cited by examiner

TELEMATICS ON-BOARD UNIT FOR VEHICLES

CROSS-REFERENCE TO RELATED APPLICATIONS

This application claims the benefit of European Patent Application No. 11 007 677.5, filed 21 Sep. 2011, the entire contents and substance of which are hereby incorporated by reference.

BACKGROUND OF THE INVENTION

1. Field of the Invention

The present invention relates to telematics on-board units for vehicles including data collection means for collecting vehicle usage data, data transmission means for transmitting collected vehicle usage data and/or analyzed vehicle usage data derived therefrom, to a telematics service platform and driver identification means for identifying a driver using the vehicle and providing a driver identification. The invention further relates to the telematics service platform having communication means for communicating with the driver identification means of the on-board unit mounted in the vehicle.

2. Description of the Related Art

Telematics on-board units are used for collecting vehicle usage data such as vehicle speed, mileage, travel routes or accelerations of the vehicle to be able to characterize the vehicle's use what in turn may be used by the telematics service platform to initiate or control certain service functions such as service/maintenance routines, emergency/accident calls, theft monitoring and car tracking, or risk assessment for determining insurance premiums. For some of those services, it is desired to know who was the driver when collecting the respective data so the collected and/or analyzed data can be associated with different drivers using the vehicle. For example, antitheft services need to differentiate if it is an authorized person or not who uses the vehicle.

Furthermore, for emergency assistance, it is helpful to know who is the driver to be able to prepare medical services depending on individual parameters such as age, blood group, personal handicaps etc. Furthermore, for risk assessment of insurance companies it is also helpful to know who is the driver to be able to calculate the insurance premium individually for the respective driver. On the other hand, extensive data transmission between the telematics on-board unit and the telematics service platform is in conflict with the requirement of privacy and data security.

It is desirable to reduce the amount of data transmitted between the on-board unit and the telematics service platform as far as possible, not only because of privacy and data security, but also because of transmission costs and required bandwidth of the equipment.

EP 0700009 B1 discloses a system for individual evaluation of motor vehicle risk including an on-board unit having data collection means for collecting vehicle usage data including acceleration of the vehicle in all three dimensions, speed of the vehicle and time periods in which the acceleration and speed values occurred. The collected data are transmitted to a data network when the vehicle is at a gasoline station. However, such system transmits lots of data. On the other hand, the system is not able to individualize the collected data and to differentiate the collected data for different drivers.

Furthermore, EP 12 41 599 A1 discloses a monitoring system for determining real time insurance costs, the system including an external information gathering device which may gather environmental information relating to a vehicle such as time, weather information or street conditions, and an internal information gathering device that may gather internal information relating to the vehicle such as the current mode of usage, the position, speed and acceleration of the vehicle. The system adjusts the insurance fee in response to the detected external and internal information.

Furthermore, U.S. Pat. No. 6,502,020 B2 discloses a driving record monitoring system using a monitoring device located in the motor vehicle, wherein the monitoring device is coupled to a navigation system determining the location of the vehicle, and to a wireless modem capable of connecting to a wireless communication network. A central computer receives information from the monitoring device as it travels in a specific region covered by the wireless communication network, wherein the central computer uses ancillary databases containing roadway information for the region in which the vehicle is traveling, route information and traffic pattern information. The collected and analyzed data are forwarded to an insurance company that assesses the risk and consequently the insurance fee on the basis of the amount of driving, the driving routes, the time of driving and the safety sensor information. However, such system does not provide for any driver identification and does not allow for individual telematics services specifically adapted to different drivers.

It is an objective of the present invention to provide an improved on-board unit for vehicles of the type mentioned at the beginning wherein disadvantages of the prior art are avoided and the prior art is further developed in an advantageous manner. In particular, the on-board unit should allow easy and quick installation in the vehicle's driver compartment and provide for a more reliable driver identification even under difficult, noisy environmental conditions with less data traffic between the on-board unit and the telematics service platform.

BRIEF SUMMARY OF THE INVENTION

According to the present invention, this objective is achieved by an on-board unit for vehicles comprising data collection means for collecting vehicle usage data, data transmission means for transmitting collected vehicle usage data and/or analyzed vehicle usage data derived therefrom, to a telematics service platform, driver identification means for identifying a driver using the vehicle and providing a driver identification, and a controller for controlling the transmission of the collected and/or analyzed vehicle usage data to the telematics service platform in response to the provided driver identification.

The driver identification means preferably includes a plurality of peripheral elements of different types for entering, detecting and/or receiving different identification data for determining the driver identification on the basis of different identification data, the different peripherals being integrated in a common component to be installed in a vehicle's passenger compartment.

The controller preferably includes adjustment means for adjusting the function and identification criteria of a first one of the plurality of peripheral elements in response to the result of the driver identification determined by a second one of the plurality of peripheral elements and/or for adjusting the function and identification criteria of the second one of the plurality of peripheral elements in response to the result of the driver identification determined by the first one of the plurality of peripheral elements.

According to the present invention, this objective also is achieved by a telematics service platform comprising data transmission means for transmitting collected vehicle usage data and/or analyzed vehicle usage data derived therefrom, to a telematics service platform, driver identification means for identifying a driver using the vehicle and providing a driver identification, and a controller for controlling the transmission of the collected and/or analyzed vehicle usage data to the telematics service platform in response to the provided driver identification.

The driver identification means can include key code receiving means for receiving a key code from the telematics service platform, the key code including an audio reference file, a pin code, biometric reference data or similar reference data for determining the driver identification from the identification data input into the driver identification means via a peripheral element in the vehicle's driver cabinet.

The on-board unit allows for different modes of driver identification and provides for different kinds of input/output or peripheral elements for detecting in different ways different identification features, wherein the different kinds of peripherals are integrated in a common box to combine easy and quick installation with more reliable driver identification. In accordance with the present invention, the driver identification means includes a plurality of peripheral elements of different types for entering, detecting and/or receiving different identification data for determining the driver identification on the basis of different identification features, the different peripherals being integrated in a common component to be installed in the vehicle's passenger compartment. The integration of different peripherals into a common unit greatly simplifies the installation of the device in the vehicle, thereby reducing time and costs of first installation and reducing the number of possible mistakes done during the installation which usually would result in a recall to the installation plant with all costs associated. Use of different types of peripherals calling up different identification features allows for reliable driver identification even under difficult, e.g. noisy environmental conditions as usually one specific peripheral is less impaired by specific conditions than another peripheral element and vice versa. A first peripheral may compensate for disturbances of a second peripheral and vice versa.

In particular, the integration of a plurality of peripherals for detecting/receiving different identification features in a single device may be utilized to adjust the function such as the used identification criteria of one peripheral in response to the identification data provided by the other peripheral. For example, voice recognition means may use criteria that are controlled in response to identification data provided by an RFID transponder. More particularly, the required level of correspondence of detected voice or audio signals with reference voice or audio signals may be lowered after having received identification data from the RFID chip. On the other hand, it also would be possible to select one of a plurality of audio reference files for the voice recognition after having received identification data from the RFID transponder. Such interdependent adaption of the identification function also could be implemented in the opposite direction. For example, after having determined a specific driver identification by means of voice recognition, the identification means could adjust the data exchange between the RFID transponder and the RFID reader or receiver, for example such that correspondence of, e.g., nine out of ten digits is deemed to be sufficient for determining driver identification, thereby allowing for less data traffic and less synchronization between the RFID transponder and the RFID reader.

Basically, various kinds of peripherals such as fingerprint scanner or iris scanner may be used for detecting or receiving the identification data to determine driver identification. However, according to a preferred embodiment of the present invention, the peripheral elements include a body feature recognizer such as a voice recognition means and code receiver for receiving a code independent from body features, such as a wireless data receiver, preferably a radio frequency identification receiver, for receiving identification data from a data storage element, preferably an RFID transponder carried by the vehicle's driver. The voice recognition means is provided for recognizing a driver's voice and determining the driver identification therefrom, thereby allowing for driver identification without presenting any specific key, any specific data carrier and without remembering plural digit number codes or passwords. In the alternative or in addition to such voice recognition means, other biometric data detection means may be provided for detecting biometric data of the driver and determining the driver's identification therefrom. Such other biometric data detector may include a fingerprint scanner or an iris scanner or any other biometric solution such as a biometric combination detector for determining the driver's identification from a combination of different biometric characteristics such as a combination of fingerprint scan, iris scan and/or size, symmetry and relative position of face characteristics such as distance of the eyes, positioning of the nose relative to mouth and/or eyes or height position of the eyes relative to the total height of the face. On the other hand, the wireless data receiver, preferably in terms of an RFID receiver, allows for precise driver identification also under noisy, difficult conditions where voice recognition is difficult. Furthermore, the integration of the wireless data receiver, preferably in terms of the RFID receiver, within the human machine interface or voice box also used for voice or biometric data recognition significantly enhances the communication between the keyless identification card and the wireless data receiver, thereby achieving less errors of synchronization and the possibility to transfer more information. The combination of means for identifying individual human physical features such as voice and means for detecting non-human identification data from a storage medium carried by the driver allows for a more secure, more reliable driver identification.

The driver identification means does not necessarily make use of such RFID transponder identification or other wireless data receiver, but may only or primarily use the voice recognition which allows for a more convenient and also more reliable driver identification as the driver's voice may not be forgotten or lost like an RFID transponder and may not be given to another driver. In particular, priority may be given to the voice recognition under usual circumstances allowing for voice recognition so that the voice recognition forms the primary basis for driver identification. The RFID identification or other data identification on the basis of input or received data may be used as a secondary basis for driver identification either to increase security if put on top of the voice recognition or as an alternative or backup means that may be used for driver identification if voice recognition is not possible, e.g. due to high background noise, or does not operate or if the voice recognition cannot identify the driver as it may be the case when an unknown driver uses the car.

In order to allow for a more reliable driver identification, it is particularly advantageous to have a biometric data detector in combination with a non-biometric identification means such as the aforementioned code receiver, preferably combined in one common box allowing for easy and quick installation. Biometric data detection may not be circumvented easily as biometric data may not be passed to any other person. On the other hand, non-biometric data detection allows for driver identification even under difficult, noisy environmental conditions so that the combination of biometric data detection and non-biometric data detection allows for a secure, but still convenient determination of the driver's identification.

According to a preferred embodiment, the aforementioned voice recognition means may include a voice recorder for recording a voice pattern of a term spoken by the driver, and a voice comparator for comparing the recorded voice pattern with at least one previously stored voice pattern of that term, wherein the driver identification is determined in response to differences and correspondences of the recorded voice pattern and the at least one previously stored voice pattern.

Such previously stored voice pattern or audio reference file may be stored at different places and made available to the comparator in different ways. One option is to store such audio reference file in a storage unit that is part of the on-board unit or directly connected thereto by means of, e.g., a data transmission line. On the other hand, according to another preferred embodiment of the present invention, the reference voice pattern may be stored in the telematics service platform so the reference voice pattern is provided to the identification means of the on-board unit each time driver identification is to be performed by the on-board unit. Such external storage of the reference voice pattern further enhances security against manipulation since access to the on-board unit only will not suffice to get access to the reference voice pattern.

Irrespective of storing the reference audio file or voice pattern in the telematics service platform, it is an advantageous embodiment of the present invention to allow for entering the reference voice pattern via the telematics service platform. For example, a user may input his reference voice pattern by speaking a specific term into a microphone connected to his/her personal home computer from which the reference voice pattern may be transmitted to the telematics service platform. Thus, the user does not have to enter the reference voice pattern in the car, where possible an increased noise level may occur.

Such remote key code input may also be used for provision of the key code for the other peripherals. For example, the RFID transponder also may be provided with the relevant identification data via the telematics service platform, where a user being in contractual relationship with the service platform provider may get access, e.g., via a network such as Internet to download the respective key code to the RFID chip.

The aforementioned voice recognition means preferably includes sound analyzing means analyzing tone pitch, pitch variation, sound level variation, tone length, voice frequency range and/or tone oscillation or other voice characteristics.

According to another preferred embodiment of the invention, the driver identification is used to reduce data traffic between the on-board unit and the telematics service platform. In particular, upon determination of a specific driver identification, the on-board unit may transmit only those collected and/or analyzed vehicle usage data to the telematics service platform that are relevant to the determined driver identification. The controller of the on-board unit may include data selection means for selecting some of the collected and/or analyzed vehicle usage data in response to the determined driver identification and transmission control means that control data transmission to the telematics service platform such that only the selected sum of the collected and/or analyzed vehicle usage data are transmitted together with the determined driver identification.

To allow for easy data selection for transmission to the telematics service platform, the controller may include data linking means for linking the collected and/or analyzed vehicle usage data to the driver identification and/or the recognized driver's voice and/or the data received from the data storage element such as the RFID transponder, and furthermore storage control means for controlling storage of the collected and/or analyzed vehicle usage data together with the driver identification and/or recognized driver's voice and/or data received from the data storage element in a storage means of the on-board unit. The respective driver identification is added as a sort of marker to the stored collected and/or analyzed vehicle usage data. Preferably, the storage means of the on-board unit provides for storage of different sets of collected and/or analyzed vehicle usage data, each set being associated with a specific driver identification determined when collecting the respective usage data. Such storage structure allows for improved multi-user management providing less data traffic between the telematics service platform and the on-board unit.

In order to reduce telecommunication costs, the system may be provided with data compression means for the compression of data to be transferred. In the alternative or in addition to such data compression, the system may include prioritizing means for prioritizing the data to be transferred, wherein such prioritizing means preferably decides on the basis of data characteristics what data are when transferred. For example, data indicating that an accident has happened and/or an emergency call may be given highest priority what may cause that such high priority data are transmitted immediately irrespective of telecommunication costs. In addition or in the alternative, other data such as mileage or average speed, relevant for calculating the insurance premium may be given a lower priority what may cause that such data are transmitted only during specific periods of time such as weekend time providing for low telecommunication costs.

Although it is desirable to be able to differentiate between vehicle usage data associated with a first driver and vehicle usage data associated with another driver, it is also desirable to have the option to transfer data without any driver identification, e.g., to allow for anonymous usage statistics or effecting routines such as vehicle maintenance routines where driver identification is not necessary to provide for maximum privacy and data security. According to a preferred embodiment of the present invention, the controller of the on-board unit includes a privacy mode selection means for disabling the driver identification means and/or allowing transmission of at least some of the collected and/or analyzed vehicle usage data without driver identification. Such privacy mode selection may be used in various situations, e.g. to make an emergency call. On the other hand, such privacy mode also may be selected by the telematics service platform when polling data for purposes where driver identification is irrelevant.

Basically different vehicle usage data may be collected and/or analyzed, wherein the selection of collected data may be adapted to the specific purpose of the telematics services. According to a preferred embodiment of the invention, the data collection means includes, or is connected to, a speed meter, an accelerometer, a mileage meter and/or a travel route recorder, wherein the data transmission means includes a speed transmitter, an acceleration transmitter, a mileage transmitter and/or a travel route transmitter for transmitting speed data, acceleration data, mileage data and/or travel route data to the telematics service platform.

According to a preferred embodiment of the present invention, the on-board unit may include data analysis means to analyze the collected data before transmitting them to the telematics service platform to reduce data traffic and data volume. For example, the data analysis means may compare the collected vehicle usage data with a predetermined range of normal vehicle usage data, wherein, e.g., only the information "normal use" is transmitted to the telematics service platform when there are no collected vehicle usage data outside the predetermined range, and, on the other hand, only the collected vehicle usage data being outside the predetermined range are transmitted to the telematics service platform. Other data reduction is of course possible, wherein, e.g., average values may be transmitted instead of all data samples, or, in the alternative, average values together with maximum and minimum values may be transmitted.

Other aspects and features of embodiments of the present invention will become apparent to those of ordinary skill in the art, upon reviewing the following detailed description in conjunction with the accompanying figures.

BRIEF DESCRIPTION OF THE FIGURES

In the following, the present invention is described in greater detail on the basis of a preferred embodiment of the invention together with accompanying drawings. In the drawings show.

DETAILED DESCRIPTION OF THE PREFERRED EMBODIMENTS

Figure 1:
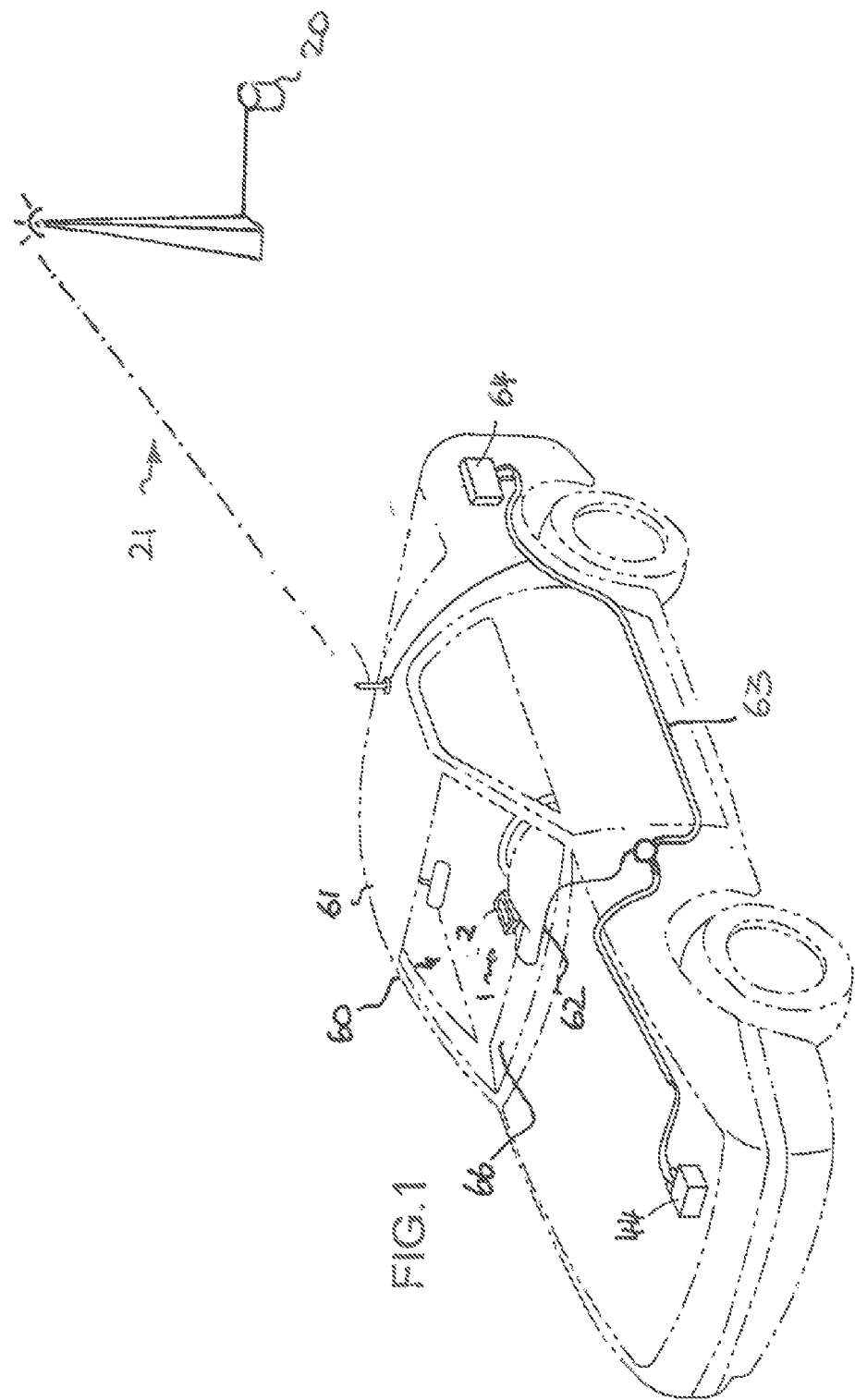
FIG. 1 is a schematic, perspective view of an automobile, in the passenger compartment of which an on-board unit according to a preferred embodiment of the present invention is installed.

To facilitate an understanding of the principles and features of the various embodiments of the invention, various illustrative embodiments are explained below. Although exemplary embodiments of the invention are explained in detail, it is to be understood that other embodiments are contemplated. Accordingly, it is not intended that the invention is limited in its scope to the details of construction and arrangement of components set forth in the following description or illustrated in the drawings. The invention is capable of other embodiments and of being practiced or carried out in various ways. Also, in describing the exemplary embodiments, specific terminology will be resorted to for the sake of clarity.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. Relational terms such as "first" and "second," and the like may be used solely to distinguish one entity or action from another entity or action without necessarily requiring or implying any actual such relationship or order between such entities or actions. The term "or" is intended to mean an inclusive "or." Further, the terms "a," "an," and "the" are intended to mean one or more unless specified otherwise or clear from the context to be directed to a singular form. The term "include" and its various forms are intended to mean including but not limited to.

Also, in describing the exemplary embodiments, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" or "substantially" one particular value and/or to "about" or "approximately" or "substantially" another particular value. When such a range is expressed, other exemplary embodiments include from the one particular value and/or to the other particular value.

Similarly, as used herein, "substantially free" of something, or "substantially pure", and like characterizations, can include both being "at least substantially free" of something, or "at least substantially pure", and being "completely free" of something, or "completely pure".

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a composition does not preclude the presence of additional components than those expressly identified.

The materials described as making up the various elements of the invention are intended to be illustrative and not restrictive. Many suitable materials that would perform the same or a similar function as the materials described herein are intended to be embraced within the scope of the invention. Such other materials not described herein can include, but are not limited to, for example, materials that are developed after the time of the development of the invention.

Furthermore, there is no intention to be bound by any expressed or implied theory presented in the preceding field of use, background or summary of the disclosure or the following detailed description. The present disclosure provides various examples, embodiments and the like, which may be described herein in terms of functional or logical block elements. Various techniques described herein may be used for various graphical user interfaces.

The various aspects described herein are presented as methods, devices (or apparatus), systems, and articles of manufacture that may include a number of components, elements, members, modules, nodes, peripherals, or the like. Further, these methods, devices, systems, and articles of manufacture may include or not include additional components, elements, members, modules, nodes, peripherals, or the like. Furthermore, the various aspects described herein may be implemented using standard programming or engineering techniques to produce software, firmware, hardware, or any combination thereof to control a computing device to implement the disclosed subject matter.

An article of manufacture as may be used herein is intended to encompass a computer program accessible from any computing device, carrier, or media. For example, a computer-readable medium may include: a magnetic storage device such as a hard disk, a floppy disk or a magnetic strip; an optical disk such as a compact disk (CD) or digital versatile disk (DVD); a smart card; and a flash memory device such as a card, stick or key drive.

Additionally, it should be appreciated that a carrier wave may be employed to carry computer-readable electronic data including those used in transmitting and receiving electronic data such as electronic mail (e-mail) or in accessing a computer network such as the Internet or a local area network (LAN). Of course, a person of ordinary skill in the art will recognize many modifications may be made to this configuration without departing from the scope or spirit of the claimed subject matter.

In the following description, numerous specific details are set forth. However, it is to be understood that embodiments of the disclosed technology may be practiced without these specific details. References to "one embodiment," "an embodiment," "example embodiment," "various embodiments," and other like terms indicate that the embodiments of the disclosed technology so described may include a particular function, feature, structure, or characteristic, but not every embodiment necessarily includes the particular function, feature, structure, or characteristic. Further, repeated use of the phrase "in one embodiment" does not necessarily refer to the same embodiment, although it may.

As shown in FIG. 1, the on-board unit according to a preferred embodiment of the invention may be installed in the passenger's compartment 60 of a vehicle 61 which may be an automobile, a motorbike or the like. The on-board unit 1 may be connected to the vehicle's data processing equipment including a board computer, a navigation system and the like, e.g. by means of a data transmission cable 62 connecting to the data bus 63 of the vehicle 61.

Figure 2:
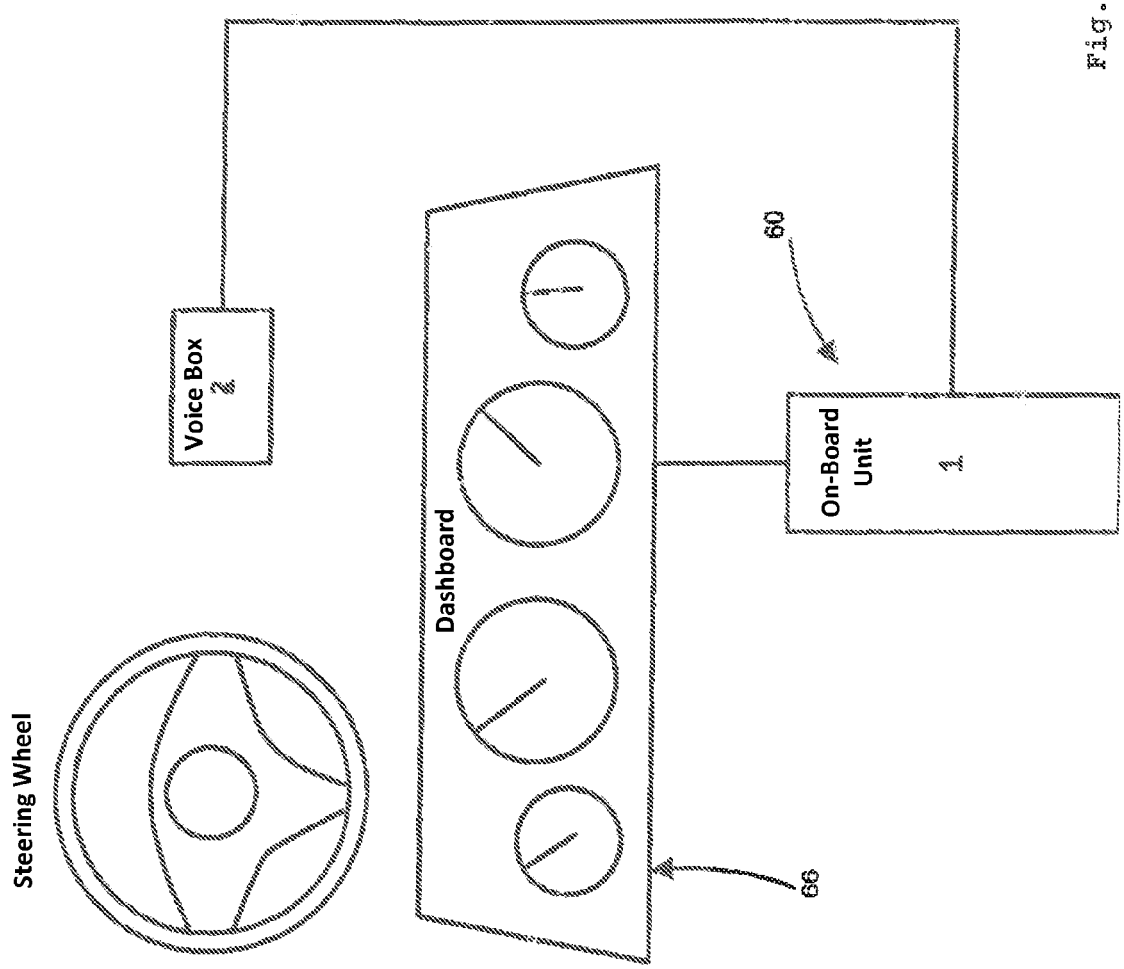
FIG. 2 is a schematic view of the arrangement of the on-board unit within the passenger compartment of the vehicle of FIG. 1.

As shown by FIG. 2, the on-board unit 1 includes a separate mounting entity that forms a common component into which several peripherals are integrated. Preferably, the common component is formed by a voice box 2 that may be positioned on the dashboard 66 of the vehicle 61, on the central operator's control panel, or it may be attached to the windscreen e.g. by means of a suction cup, or it may be positioned anywhere else within the driver's operating area.

Figure 3:
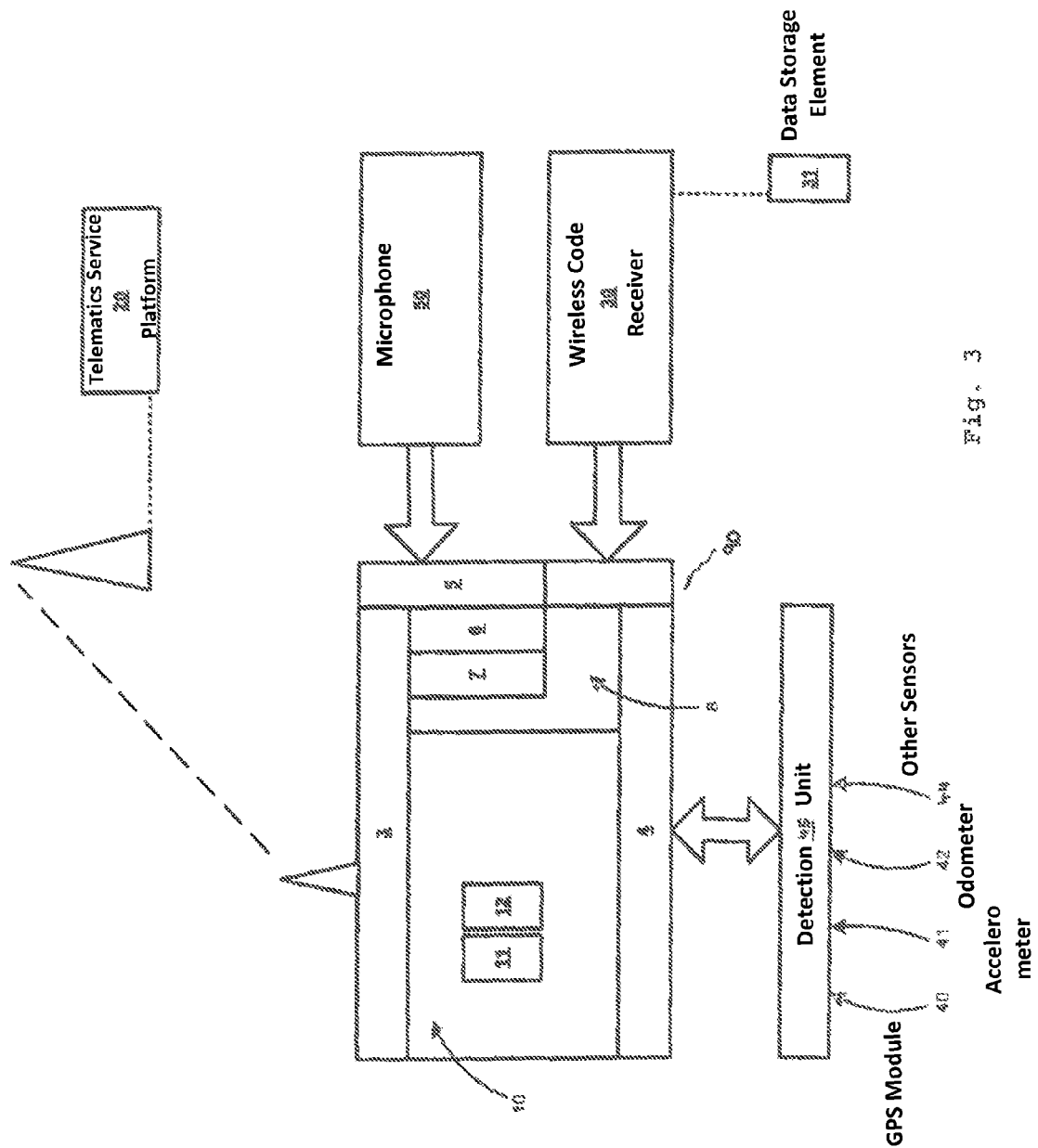
FIG. 3 is a block diagram of the on-board unit according to a preferred embodiment of the invention.

As shown by FIG. 3, the on-board unit 1 includes data collection means 90 for collecting vehicle usage data such as vehicle speed, engine speed, vehicle acceleration, mileage or travel route. The respective detection means may be part of the on-board unit 1 and/or the data collection means 2 may be connected to the respective detection means of the vehicle 61. In particular, the data collection means 90 of the on-board unit 1 may be connected to the vehicle's speed meter or GPS module 40 or any similar satellite position system such as GLONASS or GALILEO, accelerometer 41, mileage meter or odometer 42 and other sensors 44. The GPS module 40 preferably receives and decodes the GPS signal and outputs the current position preferably in terms of latitude and longitude. On the basis of such position data and the change thereof different other parameters may be determined such as vehicle speed or travel route. However, such parameters like vehicle speed and traveled distance also may be determined by other means such as a speed meter or a mileage meter of the vehicle. The odometer 42 reports the odometric distance driven and may be a virtual sensing means calculating the driven distance from the GPS data, or a physical sensor. Depending on the desired functions of the on-board unit, the data collection means 90 may by connected to other sensors 44 such as a battery sensor providing for battery voltage and/or the vehicle battery connection status, or an ignition sensor providing for the ignition status of the engine, wherein in general such other sensors may be used to retrieve information on the status of the vehicle and parameters reflecting such status that are not reported via the vehicle bus. According to FIG. 1, such detection units or sensors may be integrated in a detection unit 45 forming part of the usual control equipment of the vehicle 61. As mentioned, in the alternative, such detection equipment may be incorporated into the on-board unit 1 itself. Preferably, the data collection means 90 also may include a vehicle bus adapter 43, cf. FIG. 4, the vehicle bus adapter 43 providing ability to exchange data with the vehicle bus 63. By means of the vehicle bus adapter 43 further information on the vehicle status may be retrieved.

Furthermore, the on-board unit 1 includes data transmission means 3 to communicate with the telematics service platform 20 that may be formed by a central computing unit or a server that is accessible via a network such as the Internet. In the shown example of FIG. 1, communication between the on-board unit 1 and the telematics service platform 20 is effected by means of a wireless and/or mobile communication network such as GSM, UTMS or the like. In particular, the data transmission means 3 of the on-board unit 1 may be used to transmit the collected vehicle usage data or analyzed vehicle usage data determined therefrom and/or alarm data to the telematics service platform 20 via the mobile telecommunication network 21.

More particularly, the data transmission means 3 of the on-board unit 1 preferably includes a communication bus 100 that allows the various elements of the on-board unit to communicate with a GSM module 101 and, through the GSM module 101, with a remote server 20. For example, the communication bus 100 may allow a trip calculation module 81 and/or a theft detection module 91 and/or other modules to communicate with the GSM module 101 and through such GSM module with the remote server 20. As can be seen from FIG. 4, such trip calculation module may be connected to the data detection unit and/or the various sensors thereof via a trip data bus 80 which is used to report relevant information to the trip calculation module 81. In addition or in the alternative, theft detection module 91 may communicate with the detection unit 45 and/or the relevant sensors thereof and/or with an authorization module 33 via an alarm data bus 90 to which the sensors and detection units and also the authorization module are connected.

Use of different data and/or communication buses provides for a more structured and efficient communication between the relevant components of the on-board unit 1.

In addition to the aforementioned vehicle usage data, the on-board unit 1 determines driver identification. For this purpose, the on-board unit 1 further includes driver identification means 4 which includes, on the one hand, voice recognition means 5 and, on the other hand, a wireless code receiver 30 in terms of a preferable bidirectional RFID sender/receiver that communicates with a data storage element 31 in terms of an RFID transponder.

The aforementioned voice recognition means 5 include a microphone 50 that is provided at the aforementioned voice box 2 to allow the vehicle's driver to enter a certain identification term such as a code word into the voice recognition means 5. A voice recorder 6 records the term or tone entered into microphone 50, wherein advantageously the on-board unit 1 provides for an enter command inviting the driver to speak the respective term. Depending on the security criteria, the on-board unit 1 may display the term to be spoken by the driver or in the alternative the driver just may be invited to enter the term without indicating the term.

Figure 4:
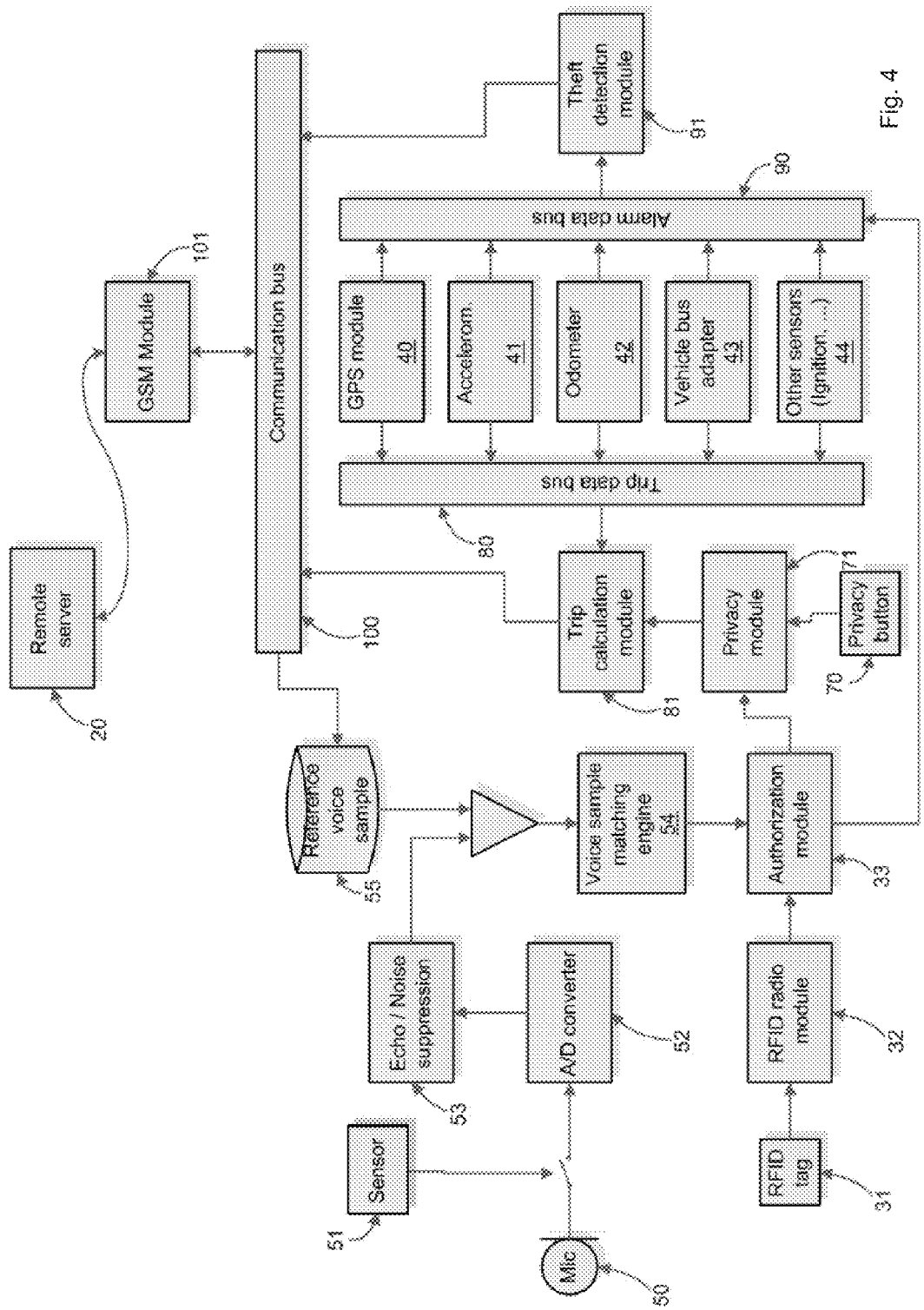
FIG. 4 is a more detailed block diagram showing the logic of the data processing system of the on-board unit and communication thereof with the remote server according to a preferred embodiment of the invention.

More particularly, as shown by FIG. 4, the voice recognition means 5 may include an audio sampling activation sensor 51 that detects driver presence and controls the start and stop of the audio sampling process. Such sensor 51 may include different sensing means such as detecting means for detecting fastening of a seat belt and/or detecting means for detecting pressure on the driver's seat and/or other detecting means such as tactile sensing means on the steering wheel or infrared light sensors for detecting the driver's presence.

The audio signals input via microphone 50 may be given to an AD converter 52 that converts the analog signals to digital signals. Preferably, the input audio signal, preferably after digital conversion, may be given to filtering means such as an echo and/or noise suppressor 53 that filters the sampled wave form to reduce ambient and/or electrical noise so as to improve the quality of the audio signal as shown by FIG. 4.

As shown by FIG. 3, the voice pattern or audio signal recorded by voice recorder 6 is then compared by a voice comparator 7 to a reference voice pattern or reference audio file which may be stored in a storage means of the on-board unit 1 or provided by the telematics service platform 20 each time driver identification is to be carried out. Such reference voice pattern or reference audio file was entered by any authorized driver in an initial setup routine, wherein preferably such initial setup routine may be carried out with a personal home computer entering the reference pattern or the reference key code into the home computer that transmits the entered data to the telematics service platform 20 which in turn forwards the reference pattern or reference file to the on-board unit 1.

Nevertheless, the comparison between the recorded voice pattern and the previously stored voice pattern is preferably affected by the on-board unit 1 to keep the data traffic to the telematics service platform limited. Such comparison may analyzed various voice pattern features including, but not limited to tone pitch, pitch variation, sound level variation, tone length, voice frequency range, tone oscillation or other voice pattern characteristics.

More particularly, as shown by FIG. 4, the audio signal input via microphone 50 and optionally converted into a digital signal by converter 52 and/or filtered by echo/noise suppression means 53, is transmitted to a voice sample matching engine 54 that compares the driver's sampled voice with the stored reference sample 55. As already mentioned, the reference voice sample 55 may have been transmitted to the on-board unit 1 from the remote server 20. As shown by FIG. 4, the GSM module 101 and the communication bus 100 connected thereto may be used for transmission of the reference voice sample from the remote server 20 to the on-board unit 1. The reference voice sample may be transmitted whenever comparison to the audio signal input via microphone 50 is required. In addition or in the alternative, the reference voice sample 55 may be transmitted once and then stored in suitable storing means at the on-board unit 1.

Depending on the comparison of the driver's sampled voice with the stored reference sample 55, the voice sample matching engine 54 reports a positive or negative outcome to the authorization module 33 which reads the input from the voice matching engine 54.

Depending on the result of the comparison, a respective driver identification is determined such as "driver 1", "driver 2" or "driver 3". If no matching voice pattern is found, the voice recognition means 5 may determine "unknown driver" as driver identification.

In addition to microphone 50, the system may include also a speaker which, together with microphone 50, allows bidirectional communication with a service center.

In addition to such voice recognition as described before, the on-board unit 1 may identify the driver from an RFID transponder carried by the respective driver. The aforementioned wireless data receiver is preferably also incorporated into the voice box 2 where the voice recognition means are provided. Such positioning of the RFID receiver minimizes communication problems that usually occur when the RFID receiver is positioned within the engine compartment or under the dashboard. Thus, also problems of synchronization are minimized.

In such RFID transponder 31, identification data identifying the respective driver may be stored so the respective identification data are transferred to the on-board unit 1 when a driver enters into the passenger's compartment 60 and the on-board unit 1 is initiated.

More particularly, as shown by FIG. 4, the wireless data receiver of the on-board unit may include an RFID radio module 32 which receives and decodes RF transmission signals from the RFID tag 31 and then provides the decoded signals to the aforementioned authorization module 33 which also reads the input from the RFID radio module 32.

The authorization module 33 which may be a piece of software run by the controller 10, may employ different authorization algorithms to control various functions such as allowing a privacy mode, reporting an alarm and others.

Upon driver identification, the on-board unit 1 collects the respective vehicle usage data as mentioned before and stores such vehicle usage data in association with the respective driver identification in the storage means of the on-board unit 1. Preferably, the on-board unit includes data analyzation means for analyzing the collected vehicle usage data. For example, average values may be determined or it may be monitored if and to what extent a predetermined range of normal operation conditions is disregarded, wherein maximum and/or minimum values outside such range of normal operating conditions may be recorded and stored.

Controller 10 of the on-board unit 1 controls the transmission of the collected and analyzed vehicle usage data to the telematics service platform 20 in response to the driver identification, wherein preferably only those vehicle usage data relevant to the respective driver identification are transmitted together with the respective driver identification, whereas other vehicle usage data are not.

The aforementioned voice box 2 may further include other communication equipment such as an emergency push button or a privacy mode selection means including a privacy push button for disabling the driver identification means 4 and/or allowing transmission of at least some of the collected and/or analyzed vehicle usage data without driver identification. Such privacy mode selection means is shown at numeral 70 in FIG. 4.

More particularly, as shown by FIG. 4, the authorization module 33 may communicate with and/or control a privacy module 71, wherein in particular the identified driver may be communicated to the privacy module 71. As shown by FIG. 4, privacy button 70 is connected to the privacy module 71 so as to allow the driver to communicate his/her request to enter in privacy mode. The privacy module 71 then controls the trip calculation module 81, more particularly the data that are forwarded by the trip calculation module 81 to communication bus 100 so as to control what data are indeed transmitted to remote server 20.

As shown by FIG. 4, authorization module 33 also communicates with theft detection module 91 via alarm data bus 90. Theft detection module 91 analyzes data from the various vehicle status sensors 40, 41, 42, 43 and 44 and from authorization module 33 to detect vehicle theft attempts. Depending on the analysis, theft detection module 91 may then communicate an alarm signal to the remote server 20 via communication bus 100 and GSM module 101.

While the invention has been disclosed in its exemplary forms, it will be apparent to those skilled in the art that many modifications, additions, and deletions can be made therein without departing from the spirit and scope of the invention and its equivalents, as set forth in the following claims.

I claim:

1. An on-board unit for a vehicle comprising:
    data collection means to collect vehicle usage data;
    data transmission means to transmit the collected vehicle usage data and/or analyzed vehicle usage data derived therefrom, to a telematics service platform; and
    driver identification means to identify a driver using the vehicle and to provide a driver identification of the driver to a controller;
    wherein the controller controls the transmission of the collected and/or analyzed vehicle usage data to the telematics service platform in response to the provided driver identification;
    wherein the controller further prioritizes the collected and/or analyzed vehicle usage data to be transferred, wherein the controller determines on the basis of data characteristics when and/or what data are transferred;
    wherein the driver identification means includes a plurality of peripheral elements of different types for entering, detecting and/or receiving different identification data for determining the driver identification on the basis of different identification data, the different peripherals being integrated in a common component to be installed in the vehicle's passenger compartment;
    wherein the controller includes adjustment means to adjust function and identification criteria of a first one of the plurality of peripheral elements in response to a result of the driver identification determined by a second one of the plurality of peripheral elements and to adjust function and identification criteria of the second one of the plurality of peripheral elements in response to a result of the driver identification determined by the first one of the plurality of peripheral elements;
    wherein the driver identification means further includes voice recognition means to recognize a driver's voice and determine the driver identification therefrom, and a wireless data receiver for wireless data reception of identification data stored on a data storage element carried by the vehicle's driver and determine the driver identification from the wireless received identification data, wherein the different peripheral elements include a microphone to input audio data for the voice recognition and the wireless data receiver to receive the stored identification data, wherein the common component is a voice box that includes both the microphone and the wireless data receiver; and
    wherein the voice recognition means includes voice pattern receiving means to receive the previously stored voice pattern from the telematics service platform for comparison with a recorded voice pattern from the audio data.

2. The on-board unit according to claim 1, wherein the controller further controls the transmission of the collected and/or analyzed vehicle usage data to the telematics service platform in response to the recognized driver's voice as well as in response to the data received from the data storage element.

3. The on-board unit according to claim 1, wherein the controller further includes adjustment means to adjust a function and/or identification criteria of the voice recognition means in response to a result of the driver identification determined by the wireless data receiver and/or to adjust a function and/or identification criteria of the wireless data receiver in response to the driver identification determined by the voice recognition means.

4. The on-board unit according to claim 3, wherein the controller further reduces a required level of correspondence of the voice or audio signals detected by the voice recognition means with reference voice or audio signals after having received the identification data from the data storage element.

5. An on-board unit for a vehicle comprising:
    data collection means to collect vehicle usage data;
    data transmission means to transmit the collected vehicle usage data to a telematics service platform; and
    driver identification means to identify a driver using the vehicle and to provide a driver identification of the driver to a controller;
    wherein the controller controls the transmission of the collected vehicle usage data to the telematics service platform in response to the provided driver identification;
    wherein the driver identification means includes a plurality of peripheral elements of different types for entering, detecting and/or receiving different identification data for determining the driver identification on the basis of different identification data, the different peripherals being integrated in a common component to be installed in the vehicle's passenger compartment;
    wherein the controller includes adjustment means to adjust one or both function criteria and identification criteria of a first one of the plurality of peripheral elements in response to a result of the driver identification determined by a second one of the plurality of peripheral elements and to adjust one or both function criteria and identification criteria of the second one of the plurality of peripheral elements in response to a result of the driver identification determined by the first one of the plurality of peripheral elements;
    wherein the driver identification means further includes voice recognition means to recognize a driver's voice and determine the driver identification therefrom, and a wireless data receiver for wireless data reception of identification data stored on a data storage element carried by the vehicle's driver and determine the driver identification from the wireless received identification data, wherein the different peripheral elements include a microphone to input audio data for the voice recognition and the wireless data receiver to receive the stored identification data, wherein the common component is a voice box that includes both the microphone and the wireless data receiver; and wherein the voice recognition means includes voice pattern receiving means to receive the previously stored voice pattern from the telematics service platform for comparison with a recorded voice pattern from the audio data.

6. The on-board unit according to claim 5, wherein the wireless data receiver includes an RFID receiver to receive the identification data from an RFID transponder carried by the vehicle's driver.

7. The on-board unit according to claim 5, wherein the controller further includes priority means to give priority to the voice recognition means such that the driver identification means uses the voice recognition first, whereas the wireless received identification data are used on a secondary basis when voice recognition is inoperative and/or a driver identification is underivable from the driver's voice.

8. The on-board unit according to claim 5, wherein the voice recognition means further includes a voice recorder to record a voice pattern of a term spoken by the driver and a voice comparator to compare the recorded voice pattern with at least one previously stored voice pattern of that term and the voice recognition means further determines the driver identification in response to differences of the recorded voice pattern and at least one previously stored voice pattern.

9. The on-board unit according to claim 8, wherein the voice recognition means further includes sound analyzing means to analyze one or more of tone pitch, pitch variation, sound level variation, tone length, voice frequency range and tone oscillation.

10. The on-board unit according to claim 5, wherein the controller further controls the transmission of the collected vehicle usage data to the telematics service platform in response to the recognized driver's voice as well as in response to the data received from the data storage element.

11. The on-board unit according to claim 5, wherein the controller further includes adjustment means to adjust one or both function criteria and identification criteria of the voice recognition means in response to a result of the driver identification determined by the wireless data receiver.

12. The on-board unit according to claim 5, wherein the controller further reduces a required level of correspondence of the voice signals detected by the voice recognition means with reference voice signals after having received identification data from the data storage element.

13. The on-board unit according to claim 5, wherein the common component is a separate mounting entity that includes connection ports to be releasably connected to a board computer of the vehicle.

14. The on-board unit according to claim 5, wherein the driver identification means further includes a biometric data detector to detect biometric data of the driver.

15. The on-board unit according to claim 5, wherein the controller further includes data selection means to select some of the collected vehicle usage data in response to the determined driver identification and transmission control means to control the transmission to the telematics service platform such that only the selected some of the collected vehicle usage data are transmitted together with the determined driver identification.

16. The on-board unit according to claim 15, wherein the controller further includes data linking means to link the collected vehicle usage data to one or more of the driver identification, the recognized driver's voice, and the data received from the data storage element, and storage control means to store the collected vehicle usage data together with the one or more driver identification, recognized driver's voice, and data received from the data storage element in storage of the on-board unit.

17. The on-board unit according to claim 5, wherein the data collection means includes, or is connected to, one or more of a GPS receiver, an accelerometer and an odometer.

18. The on-board unit according to claim 17, wherein the data transmission means includes one or more of a speed transmitter, an acceleration transmitter, a mileage transmitter and a travel route transmitter for transmission of the respective speed, acceleration, mileage and travel route to the telematics service platform.

19. The on-board unit according to claim 5, wherein the controller further includes compression means to compress the collected vehicle usage data to be transferred to the telematics service platform.

20. The on-board unit according to claim 5, wherein the controller further includes adjustment means to adjust one or both function criteria and identification criteria of the wireless data receiver in response to the driver identification determined by the voice recognition means.

21. The on-board unit according to claim 5, wherein the controller further reduces a required level of correspondence of the audio signals detected by the voice recognition means with reference audio signals after having received identification data from the data storage element.

22. The on-board unit according to claim 5, wherein the controller further prioritizes the collected vehicle usage data to be transferred.

23. The on-board unit according to claim 22, wherein the controller further determines on the basis of data characteristics when data is transferred.

24. The on-board unit according to claim 22, wherein the controller further determines on the basis of data characteristics what data is transferred.

25. An on-board unit for a vehicle comprising:
data collection means to collect vehicle usage data;
data transmission means to transmit analyzed vehicle usage data derived from the collected vehicle usage data to a telematics service platform;
driver identification means to identify a driver using the vehicle and to provide a driver identification of the driver to a controller;
wherein the controller controls the transmission of the analyzed vehicle usage data to the telematics service platform in response to the provided driver identification;
wherein the driver identification means includes a plurality of peripheral elements of different types for one or more of entering, detecting and receiving different identification data for determining the driver identification on the basis of different identification data, the peripheral elements being integrated in a common component to be installed in the vehicle's passenger compartment;
wherein the controller includes adjustment means to adjust one or both function criteria and identification criteria of a first one of the plurality of peripheral elements in response to a result of the driver identification determined by a second one of the plurality of peripheral elements and to adjust one or both function criteria and identification criteria of the second one of the plurality of peripheral elements in response to a result of the driver identification determined by the first one of the plurality of peripheral elements;

wherein the driver identification means further includes voice recognition means to recognize a driver's voice and determine the driver identification therefrom, and a wireless data receiver for wireless data reception of identification data stored on a data storage element carried by the vehicle's driver and determine the driver identification from the wireless received identification data, wherein the different peripheral elements include a microphone to input audio data for the voice recognition and the wireless data receiver to receive the stored identification data, wherein the common component is a voice box that includes both the microphone and the wireless data receiver; and wherein the voice recognition means includes voice pattern receiving means to receive the previously stored voice pattern from the telematics service platform for comparison with a recorded voice pattern from the audio data.

26. The on-board unit according to claim 25, wherein the controller further controls the transmission of the collected vehicle usage data to the telematics service platform in response to the recognized driver's voice as well as in response to the data received from the data storage element.

27. The on-board unit according to claim 25, wherein the controller further includes adjustment means to adjust one or both function criteria and identification criteria of the voice recognition means in response to a result of the driver identification determined by the wireless data receiver.

28. The on-board unit according to claim 25, wherein the controller further reduces a required level of correspondence of the voice signals detected by the voice recognition means with reference voice signals after having received identification data from the data storage element.

* * * * *